United States Patent
Chirca et al.

(10) Patent No.: US 8,977,819 B2
(45) Date of Patent: Mar. 10, 2015

(54) PREFETCH STREAM FILTER WITH FIFO ALLOCATION AND STREAM DIRECTION PREDICTION

(75) Inventors: Kai Chirca, Richardson, TX (US); Joseph R M Zbiciak, Arlington, TX (US); Matthew D Pierson, Murphy, TX (US); Timothy D Anderson, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 672 days.

(21) Appl. No.: 13/213,024

(22) Filed: Aug. 18, 2011

(65) Prior Publication Data

US 2012/0072671 A1    Mar. 22, 2012

Related U.S. Application Data

(60) Provisional application No. 61/387,367, filed on Sep. 28, 2010, provisional application No. 61/384,932, filed on Sep. 21, 2010.

(51) Int. Cl.
*G06F 12/00* (2006.01)
*G06F 12/08* (2006.01)
*G06F 9/38* (2006.01)

(52) U.S. Cl.
CPC ........ *G06F 12/0897* (2013.01); *G06F 12/0811* (2013.01); *G06F 12/0862* (2013.01); *G06F 12/0886* (2013.01); *G06F 2212/6022* (2013.01); *G06F 9/3802* (2013.01); *G06F 9/3806* (2013.01); *G06F 9/3844* (2013.01)

USPC ................ 711/137; 711/204; 711/213

(58) Field of Classification Search
CPC ............ G06F 12/0862; G06F 12/0811
USPC .................................................. 711/137
See application file for complete search history.

(56) References Cited

U.S. PATENT DOCUMENTS

| | | | |
|---|---|---|---|
| 5,958,040 A * | 9/1999 | Jouppi | 712/207 |
| 2009/0198950 A1 * | 8/2009 | Arimilli et al. | 711/205 |
| 2011/0264864 A1 * | 10/2011 | Kadambi et al. | 711/137 |
| 2012/0030431 A1 * | 2/2012 | Anderson et al. | 711/137 |

* cited by examiner

*Primary Examiner* — Aimee Li
*Assistant Examiner* — Prasith Thammavong
(74) *Attorney, Agent, or Firm* — Robert D. Marshall, Jr.; Frederick J. Telecky, Jr.

(57) ABSTRACT

A prefetch filter receives a memory read request having an associated address for accessing data that is stored in a line of memory. An address window is determined that has an address range that encompasses an address space that is twice as large as the line of memory. In response to a determination of in which half the address window includes the requested line of memory, a prefetch direction is to a first direction or to an opposite direction. The prefetch filter can include an array of slots for storing a portion of a next predicted access and determine a memory stream in response to a hit on the array by a subsequent memory request. The prefetch filter FIFO counter cycles through the slots of the array before wrapping around to a first slot of the array for storing a next predicted address portion.

16 Claims, 4 Drawing Sheets

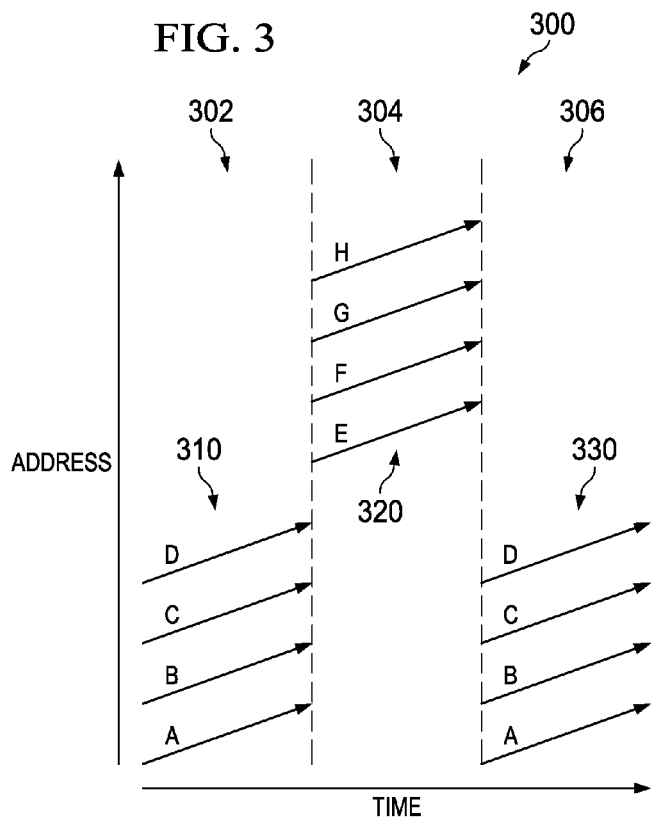
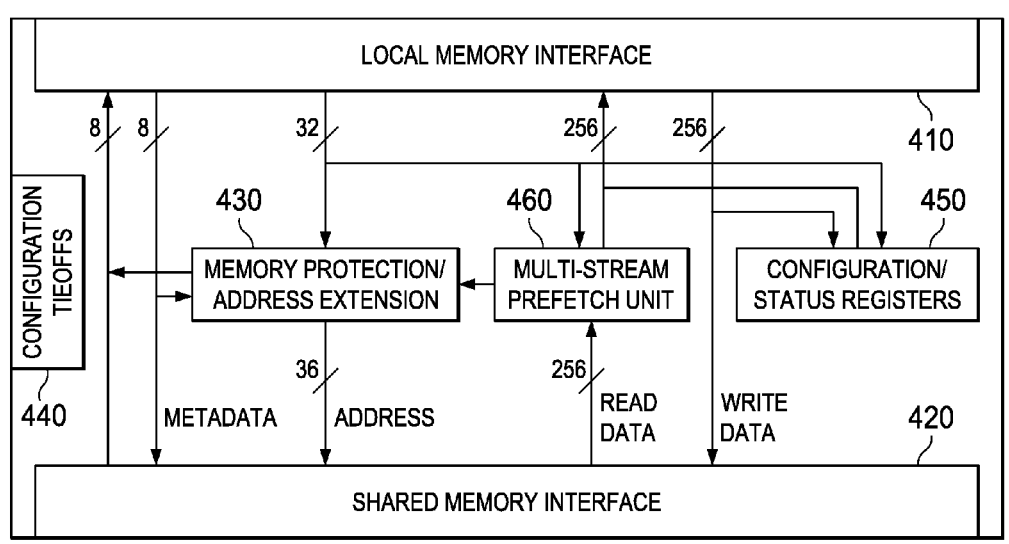

PREFETCH STREAM FILTER WITH FIFO ALLOCATION AND STREAM DIRECTION PREDICTION

CLAIM OF PRIORITY

This application for Patent claims priority to U.S. Provisional Application No. 61/387,367 entitled "Combined integer to floating point conversions with varied precision formats" filed Sep. 28, 2010, and claims priority to U.S. Provisional Application No. 61/384,932 entitled "Prefetch Stream Filter with FIFO Allocation and Stream Direction Prediction" filed Sep. 21, 2010, wherein the applications listed above are incorporated by reference herein.

BACKGROUND

In computer architecture applications, processors often use caches and other memory local to the processor to store data during execution. The processors more efficiently execute instructions when, for example, data accessed by a processor is stored locally in a cache. This problem is compounded when the referenced data is not stored or retained in a cache or localized memory, such as often occurs when memory requests due to multiple streaming are encountered. CPUs (central processing units) often use data in a stream only once, but often access multiple parallel streams in parallel. As addressed in the instant disclosure, conventional cache data replacement policies "push streams out" (e.g., overwrite cached data for a stream) if the number of cache ways are not sufficient to retain all steams of data at the same time. Thus, an improvement in techniques for lowering latency requirements when referenced data is not stored or retained in a cache is desirable.

The problems noted above are solved in large part by a prefetching filter that receives a memory read request having an associated address. As disclosed herein, a prefetch filter receives a memory read request having an associated address for accessing data that is stored in a line of memory. An address window is determined that has an address range that encompasses an address space that is twice as large as the line of memory. In response to a determination of in which half the address window includes the requested line of memory, a prefetch direction is to a first direction or to an opposite direction.

The prefetch filter can include an array of slots for storing a portion of a next predicted access and determine a memory stream in response to a hit on the array by a subsequent memory request. The prefetch filter FIFO counter cycles through the slots of the array before wrapping around to a first slot of the array for storing a next predicted address portion. An address associated with the determined memory stream (and a direction of the determined memory stream) are passed to a data prefetch buffer. Filtering random memory access and providing indications of two sequential accesses (and the direction thereof) improves the utilization of the prefetches made by the data prefetch buffer.

BRIEF DESCRIPTION OF THE DRAWINGS

FIG. 3 is a timing diagram illustrating multi-stream memory accesses over time.

FIG. 4 is a block diagram illustrating a memory controller that includes a multi-stream prefetch unit in accordance with embodiments of the present disclosure.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used (throughout the following description and claims) to refer to particular system components. As one skilled in the art will appreciate, various names can be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be through a direct electrical connection, or through an indirect electrical connection via other devices and connections. As used herein, a single device that is coupled to a bus (which includes one or more signals) can represent all instances of the devices that are coupled to each signal of the bus.

Figure 1:
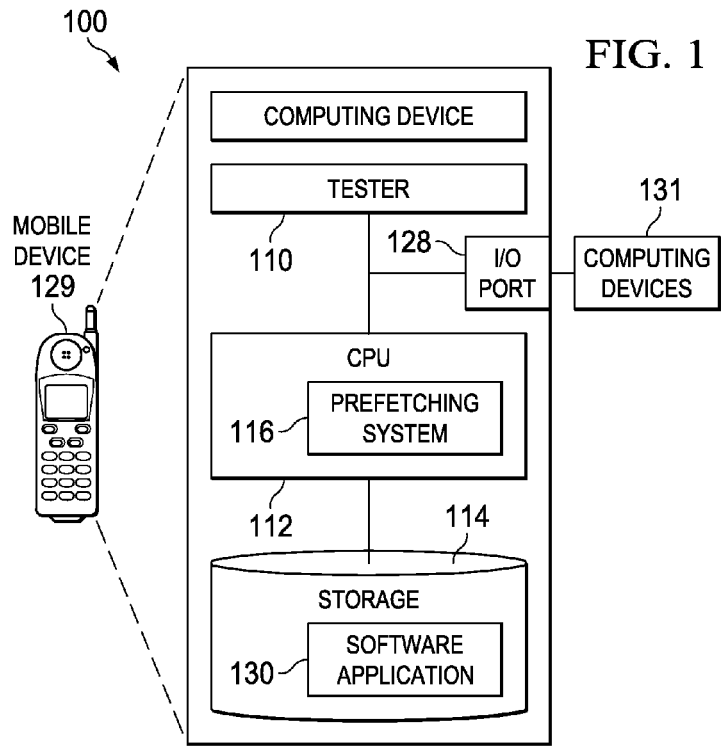
FIG. 1 depicts an illustrative computing device 100 in accordance with embodiments of the disclosure.

FIG. 1 depicts an illustrative computing device 100 in accordance with embodiments of the disclosure. The computing device 100 is, or is incorporated into, a mobile communication device 129 (such as a mobile phone or a personal digital assistant such as a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as SRAM (static RAM), flash memory, or disk storage) stores one or more software applications 130 (e.g., embedded applications) that, when executed by the CPU 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 to allow verification of how the component(s), were it actually present on the computing device 100, would perform in various situations (e.g., how the component(s) would interact with the software application 130). I/O port 128 enables data from tester 110 to be transferred to computing devices 130. In this way, the software application 130 can be debugged in an environment which resembles post-production operation.

The CPU 112 typically comprises memory and logic which store information frequently accessed from the storage 114. Various subsystems (such as the CPU 112 and/or the storage 114) of the computing device 100 include one or prefetching systems 116, which are used to perform memory prefetch operations during the execution of the software application 130.

Prefetching systems 116 track memory requests from multiple streams using "slots" to maintain pointers to memory addresses used to prefetch data for each stream. A replacement policy is used to determine which data are to be discarded when new data arrives. An optimal goal of the replacement policy is to throw away the data that is least likely to be requested again by a stream. However, the space, timing, and power required to implement optimal solutions often limit such computationally intensive solutions in hardware.

Disclosed herein are techniques for efficiently implementing reuse policies in hardware. The disclosed techniques include a FIFO (First-In First-Out) allocation policy in a multi-stream prefetch unit. Each of the slots is assigned to a stream in turn in accordance with a numbering system by which the slots are sequentially pointed to. When all of the streams have been allocated with slots, the reallocation pointer for the next available slot is set back to the first slot, thus creating a circular buffering system. A prefetch filter can be used to identify valid streams (and the direction of each stream) before assigning a stream to a slot.

Figure 2:
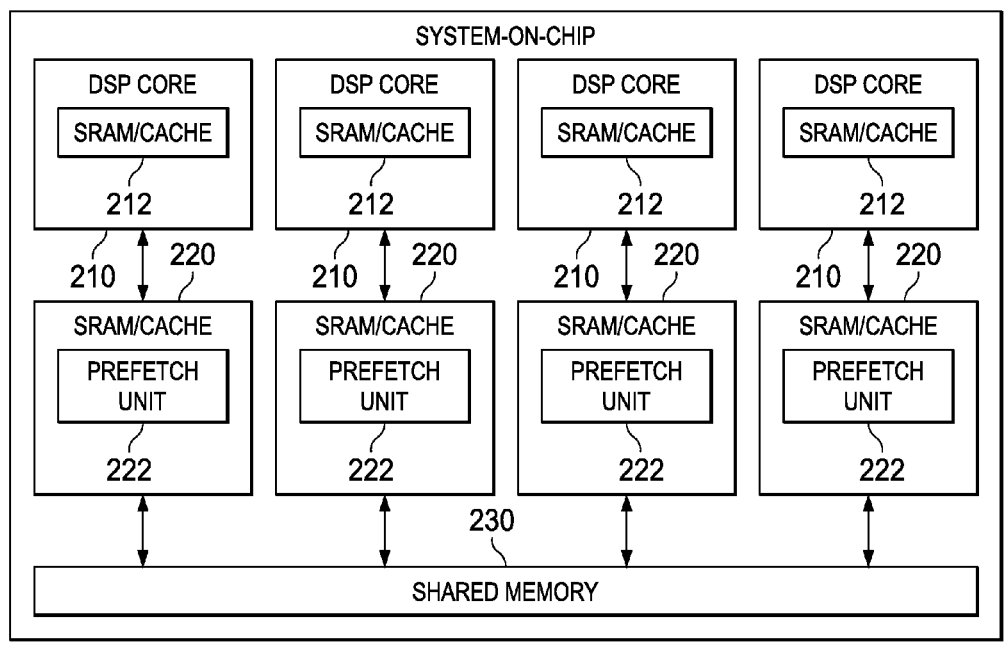
FIG. 2 is a block diagram illustrating a computing system including a prefetch unit in accordance with embodiments of the disclosure.

FIG. 2 is a block diagram illustrating a computing system including a prefetch unit in accordance with embodiments of the disclosure. Computing device 100 is illustrated as a SoC 200 that includes one or more DSP cores 210, SRAM/Caches 220, and shared memory 230. Although the illustrated elements of the computing system 200 are formed using a common substrate, the elements can also be implemented in separate circuit boards and packages (including the shared memory 230).

Each DSP core 210 optionally includes a level-one data cache such as SRAM/Cache 212. Each DSP core 210 optionally is connected to a level-two cache such as SRAM/Cache 220. Each SRAM/Cache 220 optionally includes a prefetch unit 222 for prefetching data to provide relatively quick access to read and write memory. Additionally, each DSP core 210 is coupled to a shared memory 230, which usually provides slower (and typically less expensive) memory accesses than SRAM/Cache 212 or SRAM/Cache 220. The shared memory 230 stores program and data information that can be shared between each DSP core 210.

As disclosed herein, the prefetch unit 222 is a multi-stream prefetcher that allocates an available slot to a present stream and reallocates the slot to a pending stream at a time when the present stream typically ceases to exist. In contrast, conventional solutions maintain a strict relationship between stream and slot number because the conventional allocate a certain slot to a given stream and maintain the relationship with the certain slot for reallocation when the data required by the stream is exhausted. Thus, the performance of conventional solutions is often hindered and can lead to prefetch unit stalls during prefetch generation.

FIG. 3 is a timing diagram illustrating multi-stream memory accesses over time. Plot 300 vertically represents increasing memory addresses and horizontally represents memory accesses over time. The time continuum illustrated horizontally is divided into three periods (302, 304, and 306) that represent periods in time in which an execution of a program is, for example, evaluating different equations. In period 302, a program executing a programming loop statement [1] such as (in "c" language):

$$\text{for } (i=0;\ i<n;\ i++)\{a[i]+b[i]+c[i]=d[i]\} \qquad [1]$$

performs memory accesses that, when plotted, produces traces (designated generally) 310. Each reference to an element of arrays "a," "b," "c," and "d" respectively produces a trace that, over time, progresses higher in address space. Thus, each trace of traces 310 is an illustration of a stream.

When variable "i" reaches terminal count "n," the program execution proceeds to period 304, where (for example) traces 320 are formed when another loop statement is executed. Likewise, traces 330 are formed when program execution proceeds into period 306 and re-executes programming loop statement [1]. Thus, each trace of the traces 320 and 330 is an illustration of a stream, and the plot 300 generally illustrates multi-stream memory accesses.

FIG. 4 is a block diagram illustrating a memory controller that includes a multi-stream prefetch unit in accordance with embodiments of the present disclosure. Memory controller 400 includes a local memory interface 410. The local memory interface 410 provides an interface and protocol system to handle memory requests for a local memory such as SRAM/Cache 220. In addition to providing address, read data, and write data signals, the local memory interface 410 provides information concerning prefetchability, cacheability, and an indication of half-line L2 (e.g., cache "level two") line allocation in metadata signals. The local memory interface 410 signals include information concerning command signals detailing a request, elevating the priority of a request, indicating a data versus instruction fetch, indicating whether a request is "cacheable in L2" cache, indicating a cache line size of request, and indicating a privilege/secure level of the request.

Memory controller 400 includes a shared memory interface 420. The shared memory interface 420 provides an interface and protocol system to handle memory requests for a shared memory such as shared memory 230. The shared memory interface 420 also provides additional metadata to shared memory and/or external slaves. The metadata provides information such as memory segmentation endpoints, physical addresses within sections of segmented memory, cacheability of requests, deferred privilege checking, access type (data, instruction or prefetch), and request priority and elevated priority.

Memory controller 400 includes unit for memory protection/address extension 430. The unit for memory protection/address extension 430 performs address range lookups, memory protection checks, and address extensions by combining memory protection and address extension into a single, unified process. The memory protection checks determine what types of accesses are permitted on various address ranges within the memory controller 400's 32-bit logical address map. The address extension step projects those accesses onto a larger 36-bit physical address space.

Memory controller 400 can be controlled and configured using configuration tieoffs 440 and configuration/status registers 450. Configuration tieoffs 440, for example, can be set during the manufacturing process to configure operation of the memory controller 400 for a specific system. Configuration/status registers 450, for example, can be set during operation to configure and control operation of the memory controller 400 by reading status indications and providing commands.

Memory controller 400 includes a multi-stream prefetch unit 460. The multi-stream prefetch unit 460 is discussed below with respect to FIG. 5.

Figure 5:
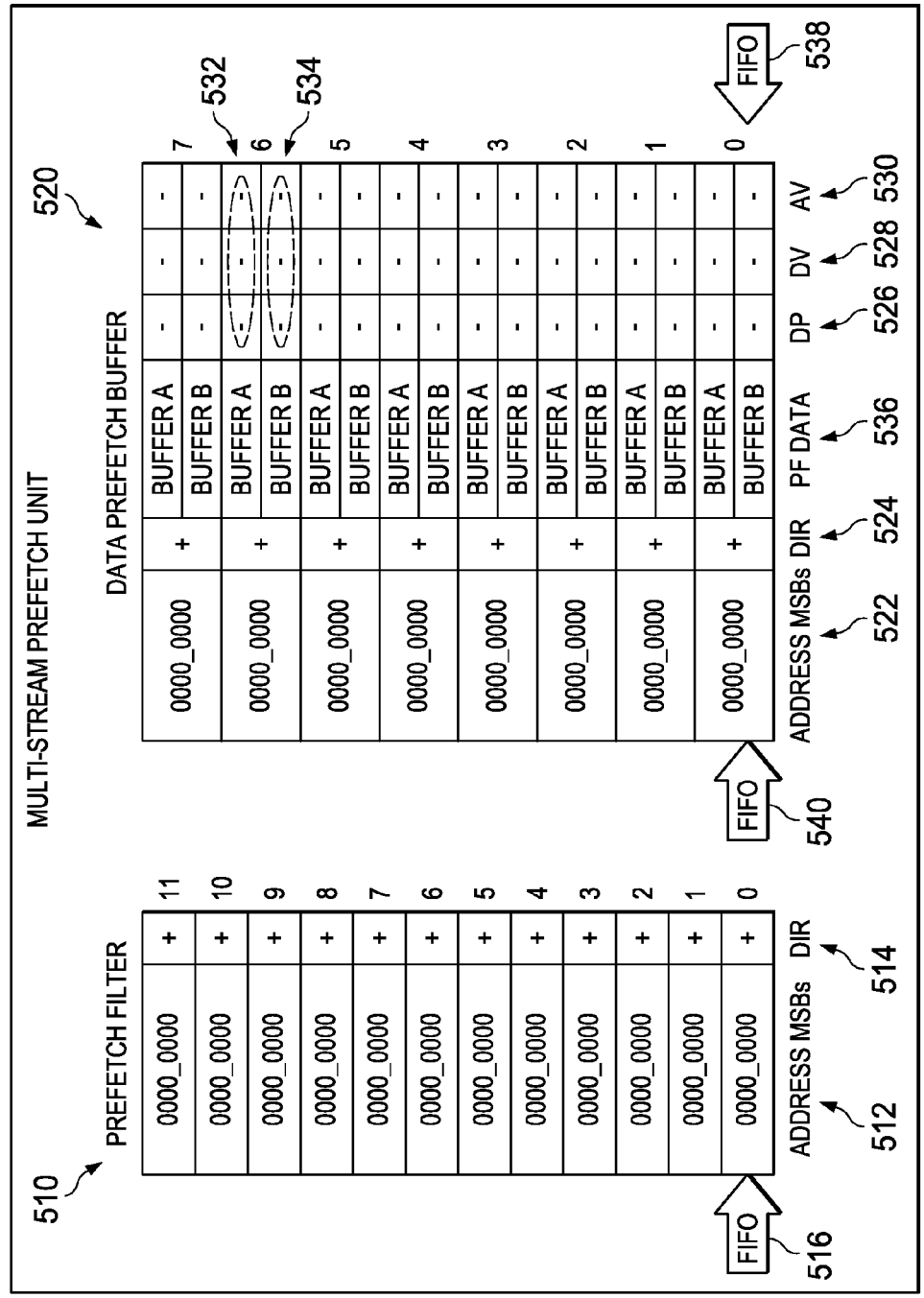
FIG. 5 is a block diagram illustrating a multi-stream prefetch unit in accordance with embodiments of the present disclosure.

FIG. 5 is a block diagram illustrating a multi-stream prefetch unit in accordance with embodiments of the present disclosure. Multi-stream prefetch unit 460 typically includes a prefetch filter 510 (which is used for identification of streams) and a data prefetch buffer 520 (which is used to prefetch data for streams having assigned slots).

Identification of streams is a difficult problem as modern DSP (digital signal processor) code often contains data streams that progress in both incrementing (upward) and decrementing (downward) directions. Memory accesses also include many non-streaming accesses (which often have the appearance of random accesses as viewed in a memory access footprint plot, and are thus referred to as "random accesses" herein) that are not part of a predictable access pattern such as streams. Attempting to prefetch cache lines based on every memory request would result in a lot of unusable speculative traffic, which greatly amplifies memory bandwidth requirements and negatively impacts performance. The disclosed prefetch filter 510 works to filter out these random (non-streaming and/or non-prefetchable) accesses so that only predictable streams are used by the data prefetch buffer 520 to prefetch.

Prefetch filter 510 is also arranged to correctly predict direction as well as the location of streams. Stream detectors typically hold addresses for potentially identifying streams while waiting for a cache read to "hit" an address associated with one of the potential streams. Thus, address prediction, direction prediction, and replacement policies for the stream detector affect the performance of the multi-stream prefetch unit 460.

Conventional stream filters use an adder to generate the next predicted address for potentially identifying a stream. In contrast, the disclosed prefetch filter 510 uses an aligned power-of-2 address window, which is used to detect sequential accesses and to determine a direction of a stream. (As discussed below, the disclosed prefetch filter 510 in most cases only takes two sequential accesses to detect a stream, and otherwise, when the direction estimate is wrong, it only takes a third access to verify the direction of a stream to be identified).

The direction estimate heuristic and FIFO-based allocation architecture minimizes power and area requirements due to their implementation efficiency while maintaining a high level of performance when executing DSP algorithms for emerging applications. Not requiring an adder to generate a sequential address for the address prediction function minimizes latency and thus improves the operating frequency of a filter implemented by a DSP that incorporates a multi-stream prefetch unit 460.

Prefetch filter 510 is a stream detection filter that includes a 12-address candidate buffer. Each slot of prefetch filter 510 stores one of up to 12 potential stream "head" (e.g., starting) addresses as logical addresses, along with a single bit (field 514) to indicate the predicted stream direction associated with that slot. Prefetch filter 510 uses a FIFO allocation order to assign a candidate stream to a slot, which is determined by a simple FIFO counter 516 (various numbering systems, such as Gray code, can be used). Each new allocation of a candidate stream in the prefetch filter 510 uses the next slot number indicated by the FIFO counter 516. Allocation in the prefetch filter 510 proceeds, starting at slot #0, counting to slot #11, and then wrapping back to slot #0 when all 12 slots have been previously allocated.

Each candidate field 512 is initialized with zeros and is used to store a significant portion (e.g., most significant bits or portion) of an address of a memory access of a potential stream. Likewise, each direction field (DIR) 514 is initialized with a bit set to indicate a positive (or, alternatively, a negative) direction that is used to determine a successive prefetch address. A particular direction field 514 can be set by comparing the next memory request of a stream with the address of the stream head (or an incremented stream head).

For example, a demand request (a memory request that originates from the program processor) is received. An address of the demand request is compared with each of the candidate field 512 values, and if none match, the demand request is passed to shared (or main) memory, and the address of the demand request is modified (e.g., incremented or decremented in accordance with the direction field 514) and placed in the candidate field 512 that is pointed to by FIFO counter 516 (which in turn is incremented or wrapped around to zero at a terminal count). When a subsequent demand request is received and matches one of the candidate field 512 values (a "hit"), the value of the candidate field 512 (or a modified value thereof) is entered into the data prefetch buffer 520 (and the hit is "qualified" as discussed below), and the candidate field 512 is reset (e.g., erased or invalidated). If the subsequent demand request that is received matches one of the candidate fields 512 by a value modified (e.g., decremented or incremented) twice, the direction field is inverted and the value of the candidate field is transferred (as discussed below). In the event of a qualified hit, the direction field 514 value is transferred to the direction field 524 of the data prefetch buffer 520.

Thus, candidate field 512 entries in the prefetch filter 510 have the potential to become prefetch streams. The detection filter first determines whether memory accesses meet criteria such as whether the memory access is prefetchable, whether the memory access is a cache line fill for data, whether the memory access is an L1D (level-1 data cache) access, whether the memory access is a non-critical half of an L2 line (level-2 cache) line access, and whether the memory access is not already present in the data prefetch buffer 520.

The memory accesses meeting the preceding qualifications are then compared against the existing entries of potential streams in the various slots of the prefetch filter 510. L1D requests are compared at 64 byte granularity, whereas L2 requests are compared at 128 byte granularity. Whether a stream associated with a memory access is entered in to a slot is determined by whether the memory access matches an entry in the prefetch filter 510.

If the memory access does not match an existing entry (a "miss"), the prefetch filter 510 allocates a new filter slot and places the predicted next address and predicted stream direction in the newly allocated slot (selected by FIFO counter 516). The prefetch filter 510 does not always protect against redundant entries, which normally only occur when thrashing the cache, and are thus relatively rare occurrences. Table 1 illustrates the logic for how a direction of a stream is predicted on the basis of the origin of the memory access (request), the requested address, and the predicted address.

TABLE 1

| Requestor | Requested Address | Predicted Address | Predicted Direction |
|---|---|---|---|
| L1D | Bit 6 = 0 | Requested address + 64 | Increasing address |
| L1D | Bit 6 = 1 | Requested address − 64 | Decreasing address |

TABLE 1-continued

| Requestor | Requested Address | Predicted Address | Predicted Direction |
|---|---|---|---|
| L2 | Bit 7 = 0 | Requested address + 128 | Increasing address |
| L2 | Bit 7 = 1 | Requested address − 128 | Decreasing address |

If the memory access request does match an existing entry in a slot of the prefetch filter 510, the prefetch filter 510 allocates a new stream slot for the stream. The new stream slot is allocated by initializing its address to the next address in that stream according to the direction bit stored with that slot. After allocating the new stream slot, prefetches are initiated for the new stream slot. Thus, all new streams are initiated by having addresses that (over time) cross a 128 byte (L1D stream) or 256 byte (L2 stream) boundary. Thus, the first two fetches for each L1D stream (being half the size of L2 streams) normally correspond to the two half-slots of a single slot.

Multi-stream prefetch unit 460 includes the data prefetch buffer 520, which is used to prefetch data for streams having assigned slots. In an embodiment, the multi-stream prefetch unit 460 is a relatively simple prefetch engine for servicing direct UP requests and L2 program fetches. The multi-stream prefetch unit 460 uses an extended memory prefetch scheme, extended to the full address space in shared memory. The multi-stream prefetch unit 460 handles cacheable, prefetchable data fetches as candidates for prefetching.

The multi-stream prefetch unit 460 holds eight logical slots, each of which is associated with storage for two 32-byte program fetches such as buffer A and B of PF (prefetch) data 536. Double buffering the data for each slot in PF data 536 allows for a prefetch to be started on a subsequent prefetch (for example) using buffer B before a memory request is made for the data in buffer A of the slot (e.g., a return-wait situation). The multi-stream prefetch unit 460 can reallocate a slot immediately if at least one of its two halves (e.g., buffer A or buffer B of PF data 536) is not busy and the slot is not in a hit-wait state (e.g., waiting for data associated with a multi-stream prefetch unit 460 hit to be read out). The double-buffer approach allows new prefetch generation to proceed immediately in case a prefetch hit results in a return-wait situation (where, for example, for a prefetch to be started on a subsequent prefetch (for example) using buffer B before a memory request is made for the data in buffer A of the slot). Double buffering each slot of the multi-stream prefetch unit 460 speeds prefetching because the multi-stream prefetch unit 460 will normally need to reallocate the slot that the most recent demand fetch just hit, and the time of allocation when the local memory will read the data for the hit is not ascertainable beforehand. Thus the double-buffer approach allows the prefetch generation to proceed even before multi-stream prefetch unit 460 sends the hit data to the upstream local memory (e.g., SRAM/Cache 220).

Also, the data prefetch buffer 520 avoids reallocating a slot in the hit-wait state in case the prefetch associated with the slot is canceled. When the prefetch is canceled, the multi-stream prefetch unit 460 uses the address stored in the slot to regenerate the demand fetch. For example, a new prefetch too early by the multi-stream prefetch unit 460 may force the stream prefetch unit 460 (belonging to a neighboring slave, for example) to cancel the earlier prefetch. Each of the eight slots has at least one address field 522, a direction field (DIR) 524, a data pending (DP) field 526, a data valid (DV) field 528, an address valid (AV) field 530, and a predicted next prefetch half-slot (PHP) field 536. Address field 522 stores upper bits of a logical address associated with the associated slot. The logical address is generated by a data prefetch address generator 558 that is arranged to generate data prefetch addresses in response to received addresses that are associated with memory requests. Data pending (DP) field 526 is used to indicate whether a prefetch is outstanding in the associated slot. Data valid (DV) field 528 is used to indicate whether the program data in the associated slot is valid. The data prefetch unit 464 does not necessarily keep a separate "address valid" bit for each stream. Instead, the data prefetch unit 464 launches prefetch requests for any slot that has data pending or data valid bit that is set to be valid. Thus, a demand fetch would normally only "hit" slots for which DP is pending or DV is valid.

A data pending (DP) field 526, a data valid (DV) field 528, and an address valid (AV) field 530 is used for each half-slot. Thus (for example), group 532 includes a data pending (DP) field 526, a data valid (DV) field 528, and an address valid (AV) field 530 for a first half slot of a slot, and group 534 includes a data pending (DP) field 526, a data valid (DV) field 528, an address valid (AV) field 530 for a second half-slot of the slot.

The multi-stream prefetch unit 460 allocates slots using a FIFO ordering system (such described above with respect to the prefetch filter 510). For example, slot #0 is allocated first (by using FIFO counter 540 to point to slot #0), followed by slot #1, #2 and #3, and so on until the last slot (such as slot #7) before wrapping back to slot #0. Each slot is associated with two 32-byte data buffers that are structured respectively as a first and second portion of a double-buffer.

Figure 6:
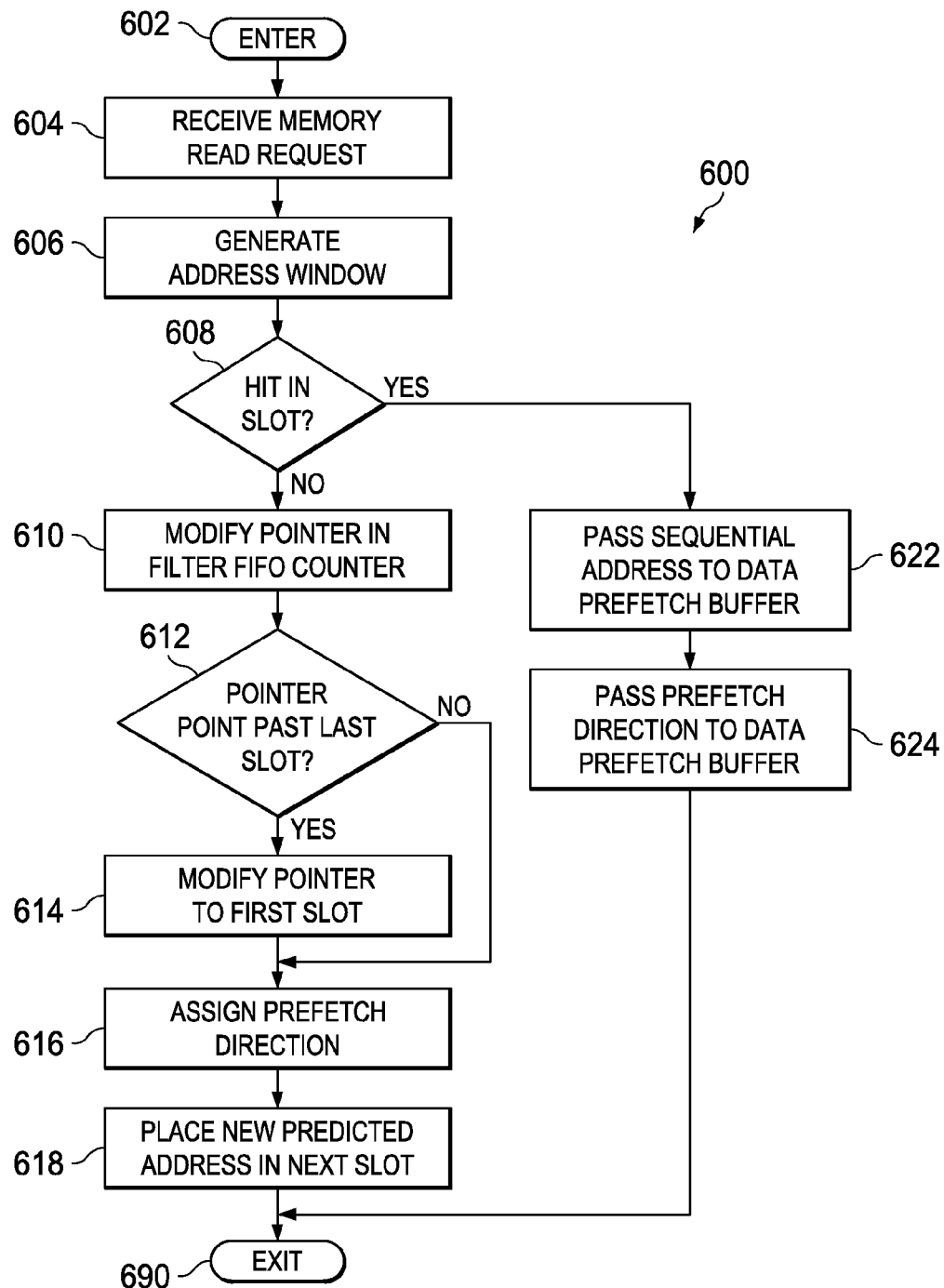
FIG. 6 is a process diagram illustrating a memory stream prediction filtering process in accordance with embodiments of the present disclosure.

FIG. 6 is a process diagram illustrating a memory stream prediction filtering process in accordance with embodiments of the present disclosure. Process 600 is entered at node 602 and proceeds to function 604. At function 604, a memory read request is received from a higher-level, local memory (which typically includes a first-level data cache and a second-level data and program cache). An address that is associated with the memory read request is normally used to generate a cache request for a memory line that includes the data addressed by the memory read request. The length of the memory line is normally a power of two (2), and, in an example embodiment is 64 bytes long.

At function 606, an address window is generated using an address that is associated with the memory read request. The address window is aligned to an address that is a power of two and encompasses an address range that is twice the length of the memory line, which in the example embodiment is 128 bytes long. Thus the requested memory line lies within an upper half of the address window or lower half of the address window.

As discussed above, the address window is used to determine a sequential memory access in a first or second direction (which in turn is used to determine the beginning of a memory stream and its direction). When, for example, a requested memory line lies within an upper half the address window, the (next) sequential access in a decreasing direction lies within the lower half of the address window. Thus, sequential accesses are detected by determining if the requested line of memory and a subsequently requested line of memory fall within the same window (which thus obviates the need for an adder to calculate sequential accesses in the filtering process). Likewise, when a requested memory line lies within a lower half the address window, a (next) sequential access in an increasing direction would then lie within the upper half of the address window.

Programmers using compilers, macro assemblers, and the like allocate memory for data storage according to selected policies. An allocation policy using the disclosed prefetch filtering process involves reserving a memory block for a decreasing stream such that the first memory request for the stream uses a memory address in the upper half of a memory address window aligned to a power of two (2) that encompasses two cache lines. In accordance with the policy, a memory block for an increasing stream is allocated such that the first memory request for the stream uses a memory address in the lower half of a memory address window aligned to a power of two (2) that encompasses two sequential cache lines. Thus, streams generated from programs using the above-described allocation policies can be identified and described (for use by a prefetcher) using only two sequential cache requests without the overhead of an adder for calculating predicted sequential accesses.

In function 608, it is determined whether an address that is associated with the received memory request is present (or "hit") in a slot of an array for storing an indication of the address of a prior cache request. The indication can be an address for addressing the memory line implicated by the prior cache request. If the slot is hit, the process flow continues to function 622, or if not, the process flow continues to function 610.

In function 610, the value (which is used as a pointer) of a filter FIFO counter (such as FIFO counter 516) is modified to point to a new slot. In various embodiments the modification can be, for example, a pre- or post-increment function. In function 612, it is determined whether the pointer points past a last slot of the array for an indication of the address of a prior cache request. If the pointer points past a last slot, the process flow continues to function 614, or if not, the process flow continues to function 616. In function 614, the pointer is modified to point to the first slot and the process flow continues to function 616. In an embodiment, a modulo counter is used that has a terminal value equal to the number of available slots of the array.

In function 616, a prefetch direction is assigned in accordance with the address window. In various embodiments, a prefetch direction can be assigned in response to a determination of which half of the address window the requested memory line lies. For example, a most significant bit of the portion of the address (of the requested memory line) that lies within the address window. In function 618, the assigned prefetch direction is used to predict a (next) sequential access in accordance with the assigned prefetch direction and the new predicted address is stored in the next slot. (In alternate embodiments, function 618 can be implemented by using, for example, by storing a tag address for the memory line or a portion of the tag address for the memory line in association with a bit representing the direction bit.) After new predicted address is stored in the next slot, the process flow continues to node 690, where the process flow exits.

In function 622, an indication of the stored predicted address is passed to the data prefetch buffer (as being a verified address of a data stream). In function 624, an indication of the associated prefetch direction is passed to the data prefetch buffer. In alternate embodiments, functions 622, and 624 can be implemented by incrementing or decrementing the stored predicted address in accordance with the associated prefetch direction, and then passing the modified value as an indication of the stored predicted address. The data prefetch buffer can use the passed data to (quickly) initiate a prefetch operation of data from a lower-level hierarchical memory (to prefetch the "third" line of memory in sequence, for example). After the indication of the stored predicted address and the associated prefetch direction have been passed to the data prefetch buffer, the process flow continues to node 690, where the process flow exits.

Thus, stored addresses for which hits are not encountered will be stored until the filter FIFO cycles through the number of slots in the prefetch filter, which gives a number of opportunities for "hitting" the slot (wherein the number of opportunities is the number of slots in the prefetch filter). Likewise, stored addresses for which hits are encountered will be stored until the filter FIFO cycles through the number of slots in the prefetch filter.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for predicting memory streams for memory prefetching in caching systems, comprising:
    receiving a memory request having an address used for generating a cache request for addressing a line of memory having a line length of consecutive memory locations;
    determining an address window for addressing a length of consecutive memory locations that is twice the line length, wherein the address window is aligned to a power of two and includes the requested line of memory in either an upper half of the address window or a lower half of the address window; and
    setting a prefetch direction for a prefetch operation to a first direction when the requested line of memory is in the upper half of the address window, and setting the prefetch direction to an opposite direction when the requested line of memory is in the upper half of the address window.

2. The method of claim 1, wherein the first direction is a decreasing direction of memory addresses, and the opposite direction is an increasing direction of memory.

3. The method of claim 1, comprising: in response to a determination that an indication of the address of the cache request is not stored within of the slots of a filter array for storing indications of the address of cache requests, storing an indication of the address of the cache request in a next slot of the filter array that is pointed to by a filter FIFO (First In-First Out) counter, wherein the filter FIFO counter is modified to cycle through the slots of the filter array to allocate each next slot for storing subsequent indications of the address of subsequent cache requests in turn before wrapping around to a first slot of the filter array.

4. The method of claim 3, wherein the storing an indication of the address of the cache request in the next slot of the filter array that is pointed to by the filter FIFO is performed in response to a determination that the indication of the address of the cache request is not stored in a slot of the filter array and a determination that the address of the cache request is not sequentially related to an indication of the address of a cache request stored in one or more slots of the filter array.

5. The method of claim 4, comprising, associating an indication of the prefetch direction setting with the indication of the address of the cache request used to set the prefetch direction.

6. The method of claim 5, wherein a sequential address is calculated in response to the storing an indication of the address of the cache request in the next slot of the filter array that is pointed to by the filter FIFO, by modifying the address of the cache request in accordance with the associated prefetch direction setting.

7. The method of claim 6, comprising: receiving a subsequent cache request for requesting a line of memory and passing an indication of the calculated sequential address to a prefetch unit for stream-based prefetching in response to a determination that the address of the line of memory requested by the subsequent cache request is the same as the calculated sequential address.

8. The method of claim 7, wherein the determination that the address of the line of memory requested by the subsequent cache request is the same as the calculated sequential address is made in response to determining whether the address of the line of memory requested by the subsequent cache request is included in the address range of the address window.

9. The method of claim 7, wherein the calculated sequential address is used to initiate a prefetch of data from a lower-level hierarchical memory.

10. The method of claim 9, wherein the calculated sequential address is stored in an array of the prefetch unit that includes slots for storing a most significant portion of predicted addresses in response to the calculated sequential address.

11. A digital system, comprising:
a memory including local memory and a lower-level hierarchical memory for storing and retrieving data; and
a prefetch filter that includes a memory interface that is arranged to receive a memory read request having an associated address that points to a line of memory stored in the lower-level hierarchical memory, wherein the prefetch filter is arranged to determine an address window for addressing a length of consecutive memory locations that is twice the length of the line of memory, wherein the address window is aligned to a power of two and includes the requested line of memory in either an upper half of the address window or a lower half of the address window, and wherein the prefetch filter is arranged to set a prefetch direction for a prefetch operation to an increasing direction when the requested line of memory is in the upper half of the address window, and to set the prefetch direction to a decreasing direction when the requested line of memory is in the upper half of the address window.

12. The system of claim 11, wherein the prefetch filter includes an array of slots for storing an indication of the address of the cache request in a next slot of the filter array that is pointed to by a filter FIFO (First In-First Out) counter, wherein the filter FIFO counter is modified to cycle through the slots of the filter array to allocate each next slot for storing subsequent indications of the address of subsequent cache requests in turn before wrapping around to a first slot of the filter array.

13. The system of claim 12, wherein the indication of the address of the cache request is stored in the next slot of the filter array in response to a determination that an indication of the address of the cache request is not stored within of the slots of the filter array.

14. The system of claim 12, wherein the indication of the address of the cache request is modified in accordance with the direction setting and is stored as the indication of the address of the cache request in response to a determination that an indication of the address of the cache request is not stored within of the slots of the filter array.

15. The system of claim 14, wherein the prefetch filter is arranged to receive a subsequent cache request for requesting a line of memory, and, in response to a determination that the address of the line of memory requested by the subsequent cache request is also encompassed by the address window, passing an indication of the address of the line of memory requested by the subsequent cache request to a prefetch unit for stream-based prefetching.

16. The system of claim 11, wherein the prefetch filter is arranged to receive a subsequent cache request for requesting a line of memory, and, in response to a determination that the address of the line of memory requested by the subsequent cache request is also encompassed by the address window, passing an indication of the address of the line of memory requested by the subsequent cache request and passing an indication of the prefetch direction to a prefetch unit for stream-based prefetching.

* * * * *